(12) United States Patent
Itoh et al.

(10) Patent No.: US 6,414,854 B2
(45) Date of Patent: Jul. 2, 2002

(54) DRIVING DEVICE AND METHOD OF SWITCHING ELEMENT IN POWER CONVERSION APPARATUS USING CURRENT-CONTROLLED SEMICONDUCTOR SWITCHING ELEMENT

(75) Inventors: Kazuyuki Itoh; Yoshihisa Okita; Katsuaki Tanaka; Yoshinobu Takayanagi, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/873,606

(22) Filed: Sep. 7, 2001

(30) Foreign Application Priority Data

Jan. 12, 2000 (JP) .......................... 2000-003303
Jan. 12, 2000 (JP) .......................... 2000-003304

(51) Int. Cl.$^7$ .......................................... H02M 3/335
(52) U.S. Cl. ............................................ 363/16
(58) Field of Search ...................... 363/16, 15, 50, 363/55; 323/907

(56) References Cited

U.S. PATENT DOCUMENTS 4,041,544 A * 8/1977 Walden .................. 361/106
4,316,242 A * 2/1982 Colangelo et al. ....... 363/21.17

FOREIGN PATENT DOCUMENTS

| JP | 47-31531 | 8/1972 |
| JP | 1-97173 | 4/1989 |
| JP | 7-264029 | 10/1995 |

OTHER PUBLICATIONS

"Development of a High Efficiency Inverter without Audible Noise," by Isao Takahashi et al., The Journal of the IEE of Japan, vol. 116–D, No. 12, 1996, pp. 1205–1210.
"How to get 99% Inverter Efficiency" by Isao Takahashi et al., IEEE, 1994, pp. 971–976. No month.
"Silent High Effiency Inverter", by Jun–Ichi Itoh et al., 1995. No month.

* cited by examiner

Primary Examiner—Shawn Riley
(74) Attorney, Agent, or Firm—Frishauf, Holtz, Goodman, Langer & Chick, P.C.

(57) ABSTRACT

In a power conversion apparatus using a semiconductor switching element, a collector-emitter voltage detecting device is provided to detect the collector-emitter voltage in the semiconductor switching element in the power conversion apparatus in order to comprehensively reduce switching loss and conduction loss arising in a switching element. A base current supplied to the switching element is controlled based on the detected collector-emitter voltage so as to control the collector-emitter voltage or control a regenerative power to be transmitted from a switching element driving power supply to an external auxiliary power supply or the like. This provides an optimum driving in consideration of factors including dispersion in a specific current amplification factor (hfe) of the switching element, variance in the hfe caused by temperature, and variance in the hfe to a current flowing through the switching element, for reducing a sum of conduction loss and driving power of the switching element.

13 Claims, 10 Drawing Sheets

_US 6,414,854 B2_

DRIVING DEVICE AND METHOD OF SWITCHING ELEMENT IN POWER CONVERSION APPARATUS USING CURRENT-CONTROLLED SEMICONDUCTOR SWITCHING ELEMENT

TECHNICAL FIELD

The present invention relates to a power conversion apparatus using a current-controlled semiconductor element as a switching element. In particular, the present invention relates to a switching-element driving device in such a power conversion apparatus. More specifically, the present invention relates to a technique for enhancing the power conversion efficiency of a power conversion apparatus using a semiconductor element as a switching element.

BACKGROUND ART

In view of efficient utilization of energy, a power conversion apparatus using a semiconductor switching element as a switching element has an extremely widespread availability due to its excellent characteristics in power conversion efficiency. The semiconductor switching element includes a voltage-driven type element, such as an isolated-gate bipolar transistor (IGBT), static-induction transistor and field-effect transistor (FET), and a current-driven type element, such as a bipolar-mode static-induction transistor (BSIT) and bipolar junction transistor (BJT).

The voltage driven type element may be driven directly by a voltage signal so that a driving circuit may be readily simplified and its driving frequency may also be arranged higher. In applications requiring a withstand voltage of 250V or more, several types of switching elements are selectively used depending on requirements for capacity and driving frequency. Specifically, in case of using the switching elements in a driving frequency range of several KHz to several hundred KHz, the IGBT excellent in overall balance of voltage drop in ON state and switching performance and the FEA having small current capacity but capable of high speed operation are widely employed in the power conversion apparatus.

On the other hand, since the current-driven switching type element is driven by applying current to a control terminal, a driving circuit tends to be complexified and to have a lower operation speed than that of the voltage-driven type element. However, the current-driven type switching element has an advantageous feature that the voltage drop in ON state is about one-third to one-sixth of that of the voltage-driven type element, and thereby provides a lower conduction loss. This proves that the current-driven type switching element is more suitable for providing a downsized power conversion apparatus.

While there are broadly classified two types of semiconductor switching elements available for the power conversion apparatus, as described above, it has been often the case that the voltage-driven type switching element having a low switching loss and facilitating a high frequency driving was employed in view of downsizing of components, simplification of circuits, downsizing based on high driving frequency, cost reduction and other. However, considering how to coping with social needs for achieving an enhanced efficiency and downsizing with an eye to the future, the level of voltage drop in ON state of the voltage-driven type element will be an obstacle as long as holding over the technique using the current voltage-driven switching element. For instance, observing the current situation, the voltage drop in ON state of the IGBT et al. being a mainstream voltage-driven switching element has already been improved closely up to the theoretical value. All the more because of its current high percentage of completion, it cannot be expected to reduce the conduction loss drastically.

As to switching loss, loss recovery techniques utilizing resonance phenomenon and soft switching techniques have been developed for preventing electromagnetic environment pollution and reducing power loss. In contrast, a conduction loss in the semiconductor switching element inevitably arises when a current is passed through the element and the level of the loss depends on the performance of the element. Thus, the conduction loss cannot be readily reduced only by a simple modification but a radical review of circuit topology.

Two primary losses arise in the semiconductor switching element of the power conversion apparatus; one is a switching loss arising in the course of changing the state of the semiconductor switching element from ON state to OFF state or from OFF state to ON state; and the other is a conduction loss caused by a voltage drop arising in the semiconductor switching element when this semiconductor switching element is in ON state. Thus, in order to provide a power conversion apparatus capable of meeting the need in response to the demand for further downsizing the current power conversion apparatus and enhancing its power density, it is necessary to develop a technique capable of achieving higher efficiency by comprehensively reducing both of the conduction loss caused by the voltage drop in ON state of the semiconductor switching element and the switching loss which lead to a power loss.

Heretofore, there have been very few cases reporting that the conduction loss in the semiconductor switching element was reduced by an effective improvement in circuit. Giving some examples from among such few cases, Japanese Patent Laid-Open Publication No. Hei 1-97173 discloses a technology for reducing both a switching loss and conduction loss in a PWM full-bridge power conversion apparatus, such as a PWM inverter, by applying a semiconductor switching element having a small conduction loss, such as a bipolar transistor, to an arm switched by commercial frequency, and a semiconductor switching element having a small switching loss, such as a static-induction transistor, to an arm switched by high-frequency, so as to make up a bridge circuit in the apparatus. The Journal of the Institute of Electrical Engineers of Japan, Section D, vol. 116, No. 12, 1996, pp. 1205–1210, also discloses a modification in circuit for reducing a conduction loss in a power conversion apparatus using semiconductor switching elements. However, these prior arts involve insufficient studies in terms of optimization of the conduction loss, reduction of the loss in their driving circuit, downsizing et al. For example, the aforementioned Japanese Patent Laid-Open Publication includes no specific teaching about how to drive the bipolar transistor serving as a current controlled switching element. However, when a constant current is applied to a base of the transistor as in conventional methods for driving transistors, the efficiency in low load will be particularly deteriorated due to the driving loss in no load state or low load state. In the technique described in the aforementioned Journal of the Institute of electrical Engineers of Japan, since a driving current is supplied to the transistor by a current transformer (CT), a base current is defined by the coil ratio of the CT. Thus, it is necessary for the circuit to be designed in consideration of the minimum current amplification factor of the semiconductor switching element. As a result, the semiconductor switching element will be driven to its oversaturated state during the low load state. In addition, the driving current may be effectively supplied only by relatively high driving frequency because of using the CT.

DISCLOSURE OF THE INVENTION

In view of the above problems, it is an object of the present invention to provide a power conversion apparatus using a semiconductor switching element and a method therefor, capable of reducing a power loss by regenerating power, and comprehensively reducing a switching loss and conduction loss arising in the switching element so as to achieve high efficiency.

It is another object of the present invention to provide a power conversion apparatus using a semiconductor switching element, capable of comprehensively reducing a switching loss and conduction loss arising in the switching element so as to achieve high efficiency.

In order to achieve the above objects, according to one aspect of the present invention, in a power conversion apparatus including a current-controlled semiconductor switching element having a collector, an emitter and a base, a switching-element driving device is provided with a current transformer having a primary winding connected in series with the switching element. A driving power supply for the switching element having rectifier means is connected to a secondary winding of the current transformer. An output of the driving power supply is supplied to the base of the switching element through a driving switch. Further, there are provided collector-emitter voltage detecting means for detecting a voltage between the collector and emitter, or a collector-emitter voltage, of the switching element, a regenerating circuit for supplying a regenerative power from the output of the driving power supply to another section having a power demand, and a collector-emitter voltage control circuit. The collector-emitter voltage control circuit controls the regenerative power to be supplied from the regenerating circuit to said another section in response to the collector-emitter voltage signal from the collector-emitter voltage detecting means so as to vary a base current to be applied to the base of the switching element and thereby control the collector-emitter voltage.

In particular type transistors, the terms "drain", "gate" and "source" are used instead of the terms "collector", "base" and "emitter". The terms "collector", "base" and "emitter" herein are intended to encompass the these cases; the term "collector" includes the drain, the term "base" including the gate, and the term "emitter" including the source.

In the preferred embodiment of the present invention, there are provided a driving power supply for supplying a current for driving the switching element, and a reverse bias circuit for applying a reverse bias to the base of the switching element. The collector-emitter voltage control circuit includes on-driving switching means adapted to connect the driving power supply to the base of the switching element, off-driving switching means adapted to connect the reverse bias power supply to the base of the switching element, and control means for controlling the regenerative power based on the collector-emitter voltage signal received from the collector-emitter voltage detecting means so as to control the base current to be supplied to the base of the switching element and thereby control the collector-emitter voltage. The on-driving switching means is conducted and the off-driving switching means is shut off when the switching element is turned on, while the off-driving switching means is conducted and the on-driving switching means is shut off when the switching element is turned off, so as to allow the switching element to be rapidly turned off by the reverse bias from the reverse bias power supply.

In the present invention, an activating power may be supplied from said section adapted to be supplied with the regenerative power to the driving power supply during an activation period of the driving power supply. The collector-emitter voltage control circuit may include switching means for controlling the regenerative power by the switching operation of the switching means so as to vary the base current to be applied to the base of the switching element, and rectifier means provided at an output section of the switching means. In this case, the rectifier means may include a rectifier element and an auxiliary rectifier element having a lower conduction resistance than that of the switching means.

In another embodiment of the present invention, the switching-element driving device may include temperature detecting means for detecting a temperature of the switching element, and a current control section adapted to store an optimum data of the collector-emitter voltage corresponding to plural different temperature values of the switching element, and define an optimum value of the collector-emitter voltage based on a temperature signal from the temperature detecting means.

According to another aspect of the present invention, there is provided collector-emitter voltage detecting means for detecting a voltage between a collector and an emitter of a semiconductor switching element in a power conversion apparatus. The collector-emitter voltage detecting means is adapted to control a base current to be supplied to the switching element based on the detected collector-emitter voltage so as to provide an optimum driving in consideration of factors including dispersion in a specific current amplification factor (hfe) of the switching element, variance in the hfe caused by temperature, and variance in the hfe to a current flowing through the switching element, for reducing a sum of conduction loss and driving power of the switching element.

More specifically, according to the aforementioned aspect of the present invention, there is provided a switching-element driving device in a power conversion apparatus including a current-controlled semiconductor switching element having a collector, an emitter and a base. This switching-element driving device according to the present invention includes an output main line connected to the base of the switching element, an output return line connected to the emitter of the switching element, and a collector-emitter voltage control means. The collector-emitter voltage control means includes the collector-emitter voltage detecting means for detecting the voltage between the collector and the emitter of the semiconductor switching element. The collector-emitter voltage control means is adapted to control a base current of the semiconductor switching element supplied to-the output main line based on the detected collector-emitter voltage so as to control the collector-emitter voltage to reduce the sum of conduction loss and driving power in the semiconductor switching element.

In another embodiment of the present invention, the switching-element driving device may include a driving power supply for supplying a current for driving the switching element, and a reverse bias means for applying a reverse bias to the base of the switching element. The collector-emitter voltage control means includes on-driving switching device adapted to connect the driving power supply to the base of the switching element, off-driving switching device adapted to connect the reverse bias power supply to the base of the switching element, and control means for controlling a base current supplied to the base of the switching element based on a collector-emitter voltage signal received from the collector-emitter voltage detecting means so as to control the collector-emitter voltage. In this case, the on-driving switching means is conducted and the off-driving switching means is shut off when the switching element is turned on, while the off-driving switching means is conducted and the on-driving switching means is shut off when the switching element is turned off, so as to allow the switching element to be rapidly turned off by the reverse bias from the reverse bias power supply.

In another embodiment according to the present invention, the collector-emitter voltage control means may include a current control section for storing an optimum data of the collector-emitter voltage of the switching element, and supplying to the base of the switching element the base current controlled based on the stored data and a collector-emitter voltage signal from the collector-emitter voltage detecting means. In this case, the switching-element driving device may include temperature detecting means for detecting a temperature of the switching element, and the current control section may be adapted to store the optimum data of the collector-emitter voltage corresponding to plural different temperature values of the switching element, so as to define an optimum value of the collector-emitter voltage based on a temperature signal from the temperature detecting means. Further, the switching-element driving device may be formed in a luminescence structure having current detecting means for detecting a collector current flowing through the collector of the switching element. The collector-emitter voltage control means may be adapted to store the optimum data of the collector-emitter voltage corresponding to plural different current value of the switching element so as to define an optimum collector-emitter voltage value based on a collector current signal from the current detecting means. Furthermore, the collector-emitter voltage control means may include base current control switching means for variably controlling the base current of the switching element by the switching operation of the base current control switching means, and rectifier means provided at an output section of the base current control switching means, and the rectifier means may be formed in a synchronous rectifier having a rectifier element and an auxiliary rectifier element having a lower conduction resistance than that of the base current control switching element.

The present invention also provides a method of driving a switching element. This method comprises the steps of obtaining a power from a secondary winding of a current transformer having a primary winding connected in series with the switching element, supplying a part of the obtained power to another section having a power demand as a regenerative power, detecting a collector-emitter voltage of the switching element as obtaining a driving current to be applied to a base of the switching element from the remaining power so as to drive the switching element, and controlling the regenerative power based on the detected collector-emitter voltage value so as to vary the driving current to be applied to the base of the switching element, and thereby control the collector-emitter voltage.

BEST MODE FOR CARRYING OUT THE INVENTION

Figure 1:
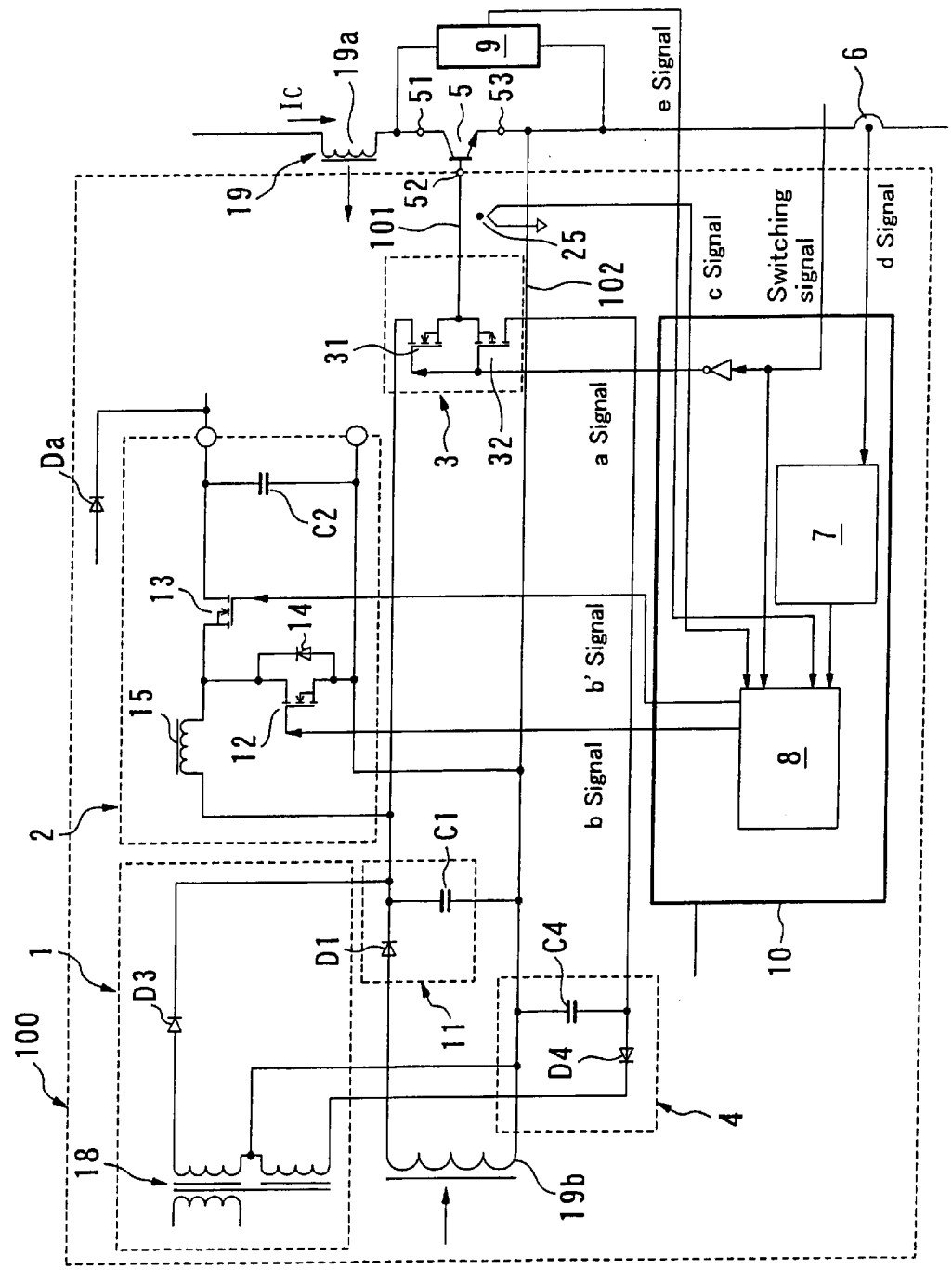
FIG. 1 is a circuit diagram showing one embodiment of a switching-element driving device according to the present invention.

With reference to the drawings, embodiments of the present invention will now be described. In FIG. 1, a transistor 5 being a current-controlled semiconductor switching element has a collector 51, a base 52, and an emitter 53. The collector 51 of the transistor 5 is connected to a power supply (not shown). A driving circuit 100 is provided for controlling the switching operation of the transistor 5 being a switching element.

The driving circuit 100 includes a driving power supply section 11. The driving power supply section 11 includes a current transformer 19 having a primary winding 19a connected in series with the collector 51 of the transistor 5. A secondary winding 19b of the current transformer 19 is connected to a rectifier circuit composed of a diode D1 and a rectifier capacitor C1. An output of the driving power supply section 11 is connected to an ON-OFF switching circuit 3. One end of the ON-OFF switching circuit 3 is connected to a positive terminal of the driving power supply section 11, and the other end is connected to a negative terminal of the driving power supply section 11 through a reverse bias power supply 4. An output of the ON-OFF switching circuit 3 is connected to the base 52 of the transistor 5 through an output main line 101 of the driving circuit 100. The driving circuit 100 has an output return line 102, which is connected to the negative terminal of the driving power supply section 11. The ON-OFF switching circuit 3 comprises a positive switching element 31 and a negative switching element 32 connected in series with each other, and a connection point of the switching elements 31 and 32 is connected to the output main line 101. Each of the switching elements 31 and 32 are formed of a field effect transistor, and switching signals for controlling the switching operation of these elements are supplied from a control device (not shown).

A current detector 6 is provided to detect a collector current IC flowing through the collector of the transistor 5. A temperature detector 25 is provided to detect a temperature T of the transistor 5. A collector current signal from the current detector 6 and a temperature signal from the temperature detector 25 are input into a collector-emitter voltage command processor 7 for processing a command value for a voltage between the collector and the emitter, or a collector-emitter voltage. An output of the processor 7 is input into a control circuit 8 outputting a control signal for controlling an output current of the driving power supply section 11. The switching signal is also input into the control circuit 8. The transistor 5 is also provided with a voltage detector 9 for detecting the collector-emitter voltage of the transistor 5. The detected voltage signal is input into the control circuit 8. The control circuit 8 generates a control signal based on the input signal.

The driving circuit 100 is provided with a power regenerating circuit 2 for supplying a power from the driving power supply section 11 to another section such as an auxiliary power source (not shown) having a power demand as a regenerative power. This power regenerating circuit 2 includes an inductor 15 and a switching element 12 connected in series between positive and negative terminals of the driving power supply section 11, and a diode 14 is connected in parallel with the switching element 12 to bring the direction of the inductor 15 to a forward direction. A connection point between the inductor 15 and the switching element 12 is connected to an auxiliary power supply serving as a receiving section of the regenerative power through the switching element 13. FIG. 1 shows only a rectifier diode Da of the auxiliary power supply for reference. A rectifier capacitor C2 is connected between an output section of the switching element 13 and the negative terminal of the driving power supply section 11. A control signal from the control circuit 8 is sent to the switching elements 12 and 13 of the power regenerating circuit 2 to control these switching elements.

Further, the driving circuit 100 includes an activating auxiliary power supply 1. The activating auxiliary power supply 1 has an auxiliary power supply transformer 18. A secondary winding of the auxiliary power supply transformer 18 is connected to a secondary winding 19b of the current transformer 19 through a diode D3. In the illustrated example, the reverse bias power supply 4 is composed of a rectifier circuit including a diode D4 connected to the secondary winding of the auxiliary transformer 18 and a rectifier capacitor C4.

The operation of the driving circuit 100 shown in FIG. 1 will now be described. When the driving circuit 100 is turned on, the positive switching element 31 of the switching circuit 3 is turned on, and the negative switching element 32 is turned off, by the switching signal applied from outside. The output of the driving circuit 100 is applied from the output main line 101 to the base 52 of the transistor 5 to turn on the transistor 5.

In the driving circuit 100, the collector current IC of the transistor 5 is detected by the current detector 6, and the detected collector current signal is input into the collector-emitter voltage command processor 7. At the same time, a temperature of the transistor 5 is detected by the temperature detector 25, and the detected temperature signal is input into the collector-emitter voltage command processor 7. The processor 7 calculates an optimum value of the collector-emitter voltage of the transistor 5 based on the current signal input from the collector current detector 6 and the temperature signal from the temperature detector 25, and the processor 7 transmits the calculated result to the control circuit 8 as a collector-emitter voltage command signal. The collector-emitter voltage of the transistor 5 is also detected by the voltage detector 9 and this detected voltage signal is input into the control circuit 8.

The control circuit 8 generates a control signal based on the collector-emitter voltage command signal and the actual collector-emitter voltage value from the detector 9. The control signal is used to drive the switching elements 12 and 13 in the power regenerating circuit 2. The current to be supplied from the power regenerating circuit 2 to the external auxiliary power supply is controlled based on the control signal, and the current corresponding to the remaining power is applied from the output main line 101 to the base 52 of the transistor 5 through the positive switching element 31 in the ON-OFF switching circuit 3. In this manner, the base current of the transistor 5 is controlled to provide the optimum value of the collector-emitter voltage of the transistor 5.

Figure 2:
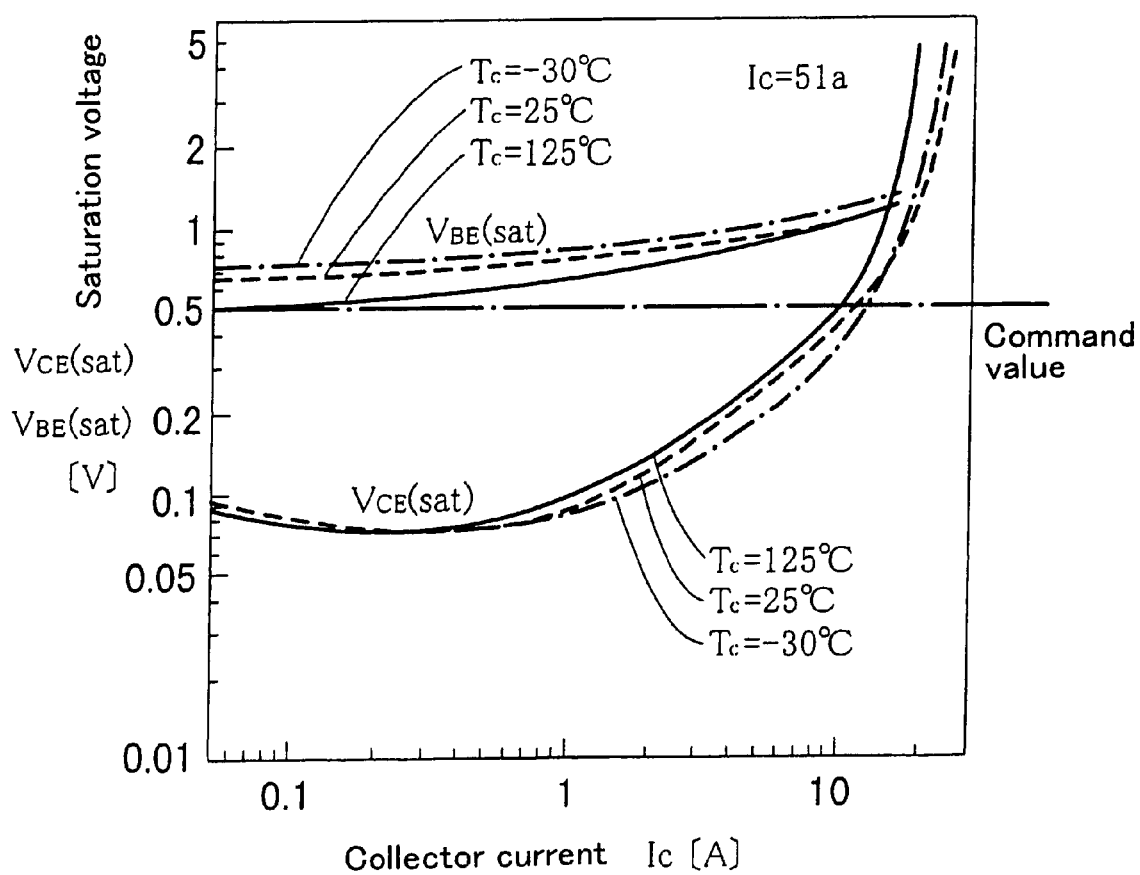
FIG. 2 is a diagram showing the relationship between a saturation voltage and a collector current in a transistor.

FIG. 2 is a diagram showing a saturation voltage characteristic between the collector and the emitter for the collector current during the transistor 5 is turned on. In this diagram, the vertical axis indicates a saturation voltage value and the horizontal axis indicates a collector current. For example, in case that the voltage between the collector-emitter voltage command is set to a constant value of 0.5 v, a saturation voltage $V_{CE}$(sat) of the collector-emitter voltage for the collector current Ic is significantly lower than the command value in most range. Thus, the base 52 of the transistor 5 will be supplied with an undesirable current value much higher than the base current value corresponding to the saturation voltage, and thereby the driving power and the conduction loss may not be sufficiently reduced.

In the driving circuit 100 shown in FIG. 1, the data of the characteristic curve of the collector-emitter voltage $V_{CE}$ (SAT) to the collector current shown in FIG. 2 or another data of a characteristic curve indicating a slightly lower than that in the above characteristic curve is stored. The stored data of this characteristic value in the processor 7 may be corrected depending on individual dispersion of the transistor 5. The processor 7 reads out the optimum value of the collector-emitter voltage from the data of the stored characteristic value based on the current signal detected by the collector current detector 6 and the temperature signal detected by the temperature detector 25, and then calculates the collector-emitter voltage command to apply it to the control circuit 8. In this manner, the output current, which is output to the output main line 101 of the driving circuit 100 and applied to the base of the transistor 5, is set to allow the transistor 5 to be operated by an optimum collector-emitter voltage. Thus, the transistor 5 may be operated under the conditions such that a sum of conduction loss and driving power loss during the transistor is turned on, including the individual dispersion of the transistor, is decreased.

Figure 3:
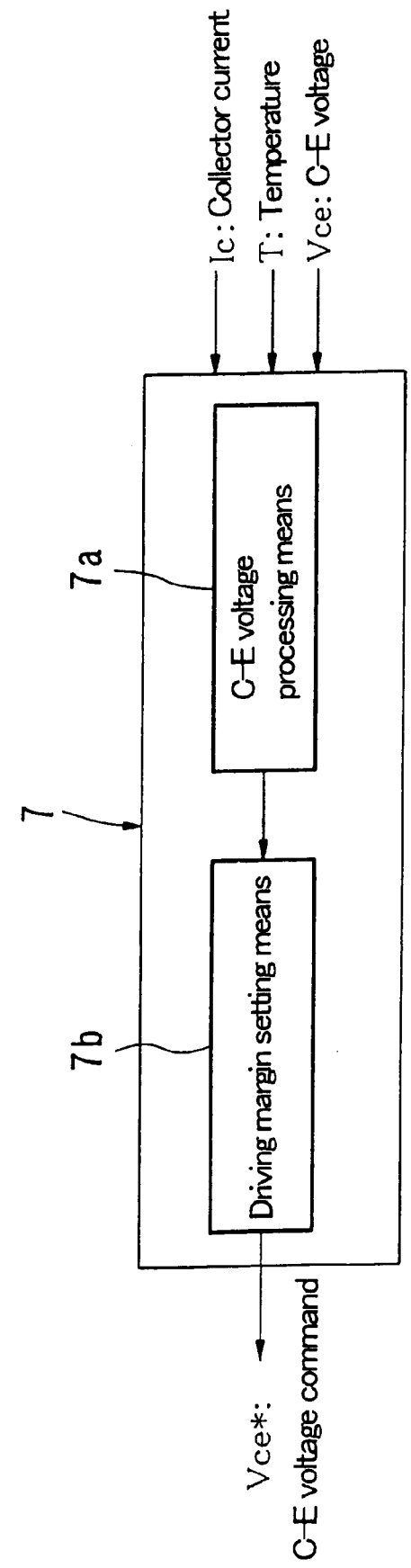
FIG. 3 is a block diagram showing one example of a structure of a collector-emitter voltage command processor.

FIG. 3 is a block diagram showing one example of the structure of the collector-emitter voltage command processor 7 in this driving circuit 100. The processor 7 includes a collector-emitter voltage processing section 7a and a driving-margin setting section 7b. For input signals, the collector current signal Ic, the temperature signal T, and the collector-emitter voltage signal $V_{CE}$ are input. The driving-margin setting section 7b sets a margin to prevent the shortage of the driving power due to the dispersion in the characteristic of the transistor 5 and the detection error of the current detector. For this purpose, the output of the collector-emitter voltage processing section 7a is multiplied by a certain factor, or added by a certain value to generate a command value having an adequate margin.

The operation during the transistor 5 is turned off will now be described. When the transistor 5 is turned off, the current from the driving power supply section 11 flows into the auxiliary power supply from the power regenerating circuit 2. In the switching circuit 3, the ON switch 31 is turned off, and the OFF switch 32 is turned on. As a result, the reverse bias is supplied to the base 52 of the transistor 5 from the reverse bias power supply 4. Thus, the accumulated electric charge in the transistor 5 is taken out in a short time. This allows the turn-off operation to be carried out at high speed and a noise margin to be sufficiently provided during the turn-off operation.

Figure 4:
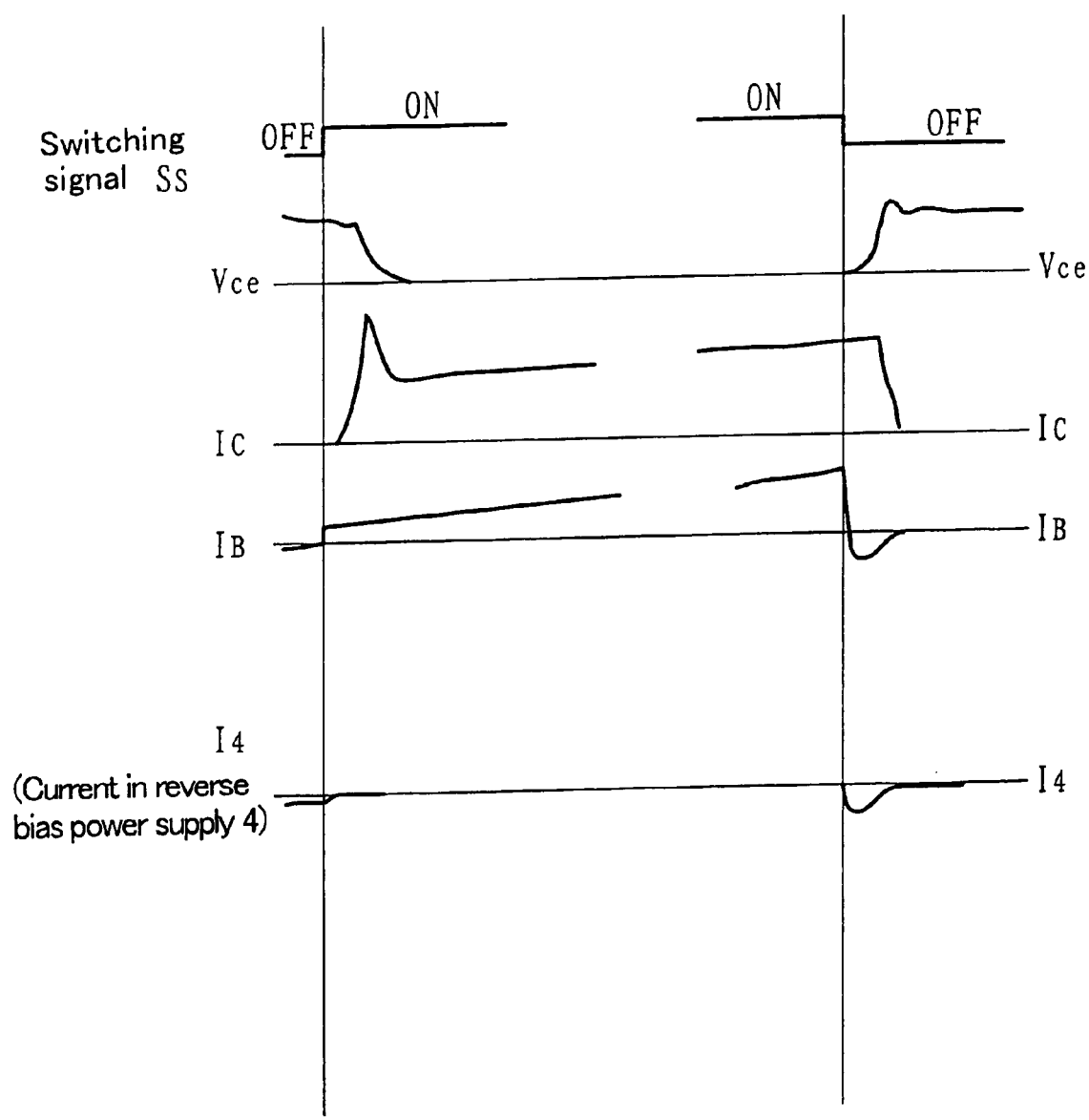
FIG. 4 is a diagram showing a waveform at each section during switching operations in one embodiment of the present invention.

The switching operation will now be described. FIGS. 4(a) and 4(b) show waveforms at each section in the driving circuit 100 during the switch is turned on and turned off, respectively. With reference to FIG. 4(a), when the transistor 5 is turned on from its off state, a switching signal Ss becomes High to turn on the ON switch 31 and turn off the OFF switch 32 in the ON-OFF switching circuit 3. Thus, the base current is supplied to the base 52 of the transistor 5 from the driving power supply section 11 through the output main line 101 to turn on the transistor 5. The current corresponding to the collector current Ic of the transistor 5 is supplied to the driving power supply section 11 from the secondary winding of the current transformer 19. Then, the power supply section 11 rectifies the supplied current and supplies it to the switching circuit 3. In this state, the collector-emitter voltage Vce of the transistor 5 is detected by the collector-emitter voltage detector 9. The collector current Ic flowing through the transistor 5 and the temperature of the transistor 5 are also detected. Further, as described above, the difference in characteristic value corresponding to the dispersion of each transistor is stored in the processor 7. The processor 7 calculates the value of the base current necessary to obtain the optimum collector-emitter voltage based on these stored data, and generates a collector-emitter voltage command signal. The control circuit 8 determines the regenerative power to be supplied to the auxiliary power supply based on this command signal, and generates a control signal corresponding thereto. The switching elements 12 and 13 of the current regenerating circuit 2 are controllably switched based on this control signal. As a result, the base current IB having an adequate value is supplied to the base 52 of the transistor 5. The excessive power is sent to the auxiliary power supply from the power regenerating circuit 2. The change of the collector current Ic is shown in FIG. 4(a).

When the transistor 5 is turn off, if the turning off signal is applied in FIG. 4(b), the ON switch 31 in the switching circuit 3 is turned off, and the OFF switch 32 is turned on. Thus, the reverse bias from the reverse bias power supply 4 is applied to the base 52 of the transistor 5.

As described above, in the aforementioned embodiment of the present invention, the transistor 5 is driven to have an optimum collector-emitter voltage by controlling the base current of the transistor 5 by controlling the power taken out of the driving power supply section by the power regenerating circuit 2. Thus, the optimum driving current and collector-emitter voltage may be obtain despite of the dispersion of hfe of the individual transistor 5 and the variance of hfe by temperature, and thereby the conduction loss between the collector and the emitter in the transistor 5 and the driving power may be reduced. The switching element 12 and the auxiliary rectifier element 14 of the power supply 1 are driven at a high frequency of several hundred KHz or more. Further, the base current of the transistor 5 is supplied from this current variable driving circuit, and the driving current may be supplied continually. In addition, the transistor 5 being a switching element may be kept in ON state or OFF state for a long time. The device may also be driven by a DC or low frequency.

The voltage drop between the base and emitter of the transistor 5 used as a switching element is as low as 1V, but the loss of the power regenerating circuit 2 may be reduced through the synchronous rectifier effect by using the switching element 13, such as FET, as an auxiliary rectifier element in the driving power supply section 11 of the driving circuit 100. Since 1V is sufficient for the output of the driving circuit 100, the voltage inside of the driving circuit may be set in a few V at minimum. Thus, the low withstand voltage and the low on-resistance element, such as FET, may be used for the switching element 12 and the auxiliary rectifier element 14, which may provide further reduced loss in the driving circuit.

In the above embodiment, the transistor 5 has been described as a type having the collector 51, the base 52, and the emitter 53. However, in case that the bipolar mode static induction transistor (BSIT) is used as the switching element, a drain takes the place of the collector, a gate does the base, and a source does the emitter. The control circuit 8 may be formed in a digital construction, or in an analog construction using analog components, such as an operational amplifier and a comparator.

In the embodiment of FIG. 1, the activating power supply 1 is provided to activate the driving circuit 100, and the secondary winding of the auxiliary power supply transformer 18 for the activating power supply 1 is connected to the secondary winding 19b of the current transformer 19 through the diode D3. Thus, for activating the driving circuit 100, when the ON switch 31 in the switching circuit 3 is turned on, the power supplied from the secondary winding of the auxiliary power supply transformer 18 through the diode D3 is applied to the base 52 of the transistor 5 as the output of the driving circuit 100.

Figure 1A:
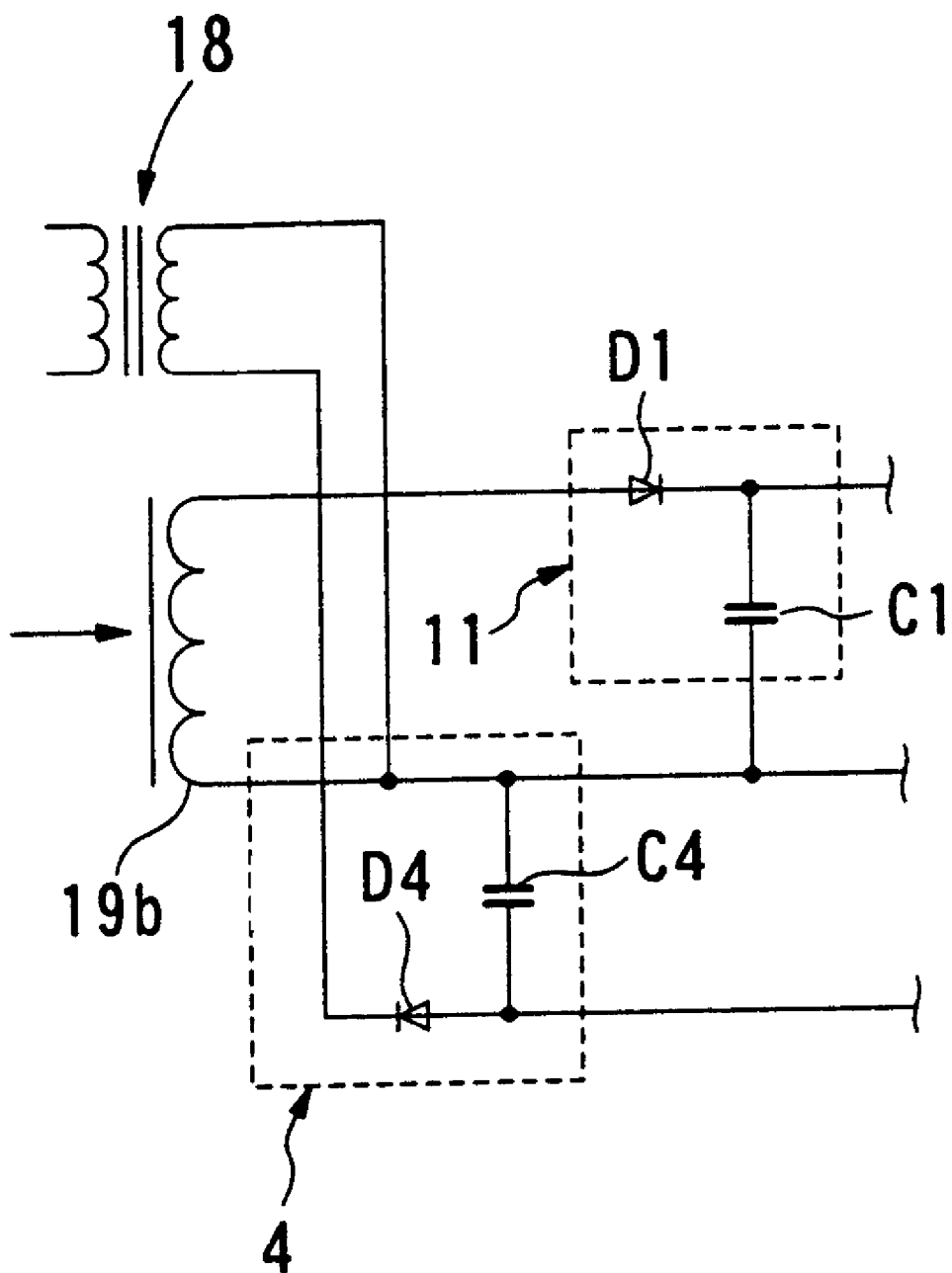
FIG. 1(a) is a circuit diagram showing a modification of the circuit shown in FIG. 1.

As another method for activating the driving circuit 100, the switching element 13 in the power regenerating circuit 1 may be turned on by an external power. In other words, the activating power for turning on the switching element 13 may be supplied from another section adapted to receive the regenerative power from the power regenerating circuit 2, e.g. another auxiliary power supply in which only the rectifier diode Da is shown in FIG. 1 as a part of its elements. When the switching element 13 is turned on, the activating power is applied to the ON switch 31 in the switching circuit 3 from the another auxiliary power supply as a section adapted to receive the supply of the regenerative power from the power regenerating circuit 2. Thus, in case of employing this activating method, it is not necessary to provide the circuit including the diode D3 as an activating current supply 1. FIG. 1(a) shows the construction of the auxiliary power supply transformer 18 in this case.

Figure 5:
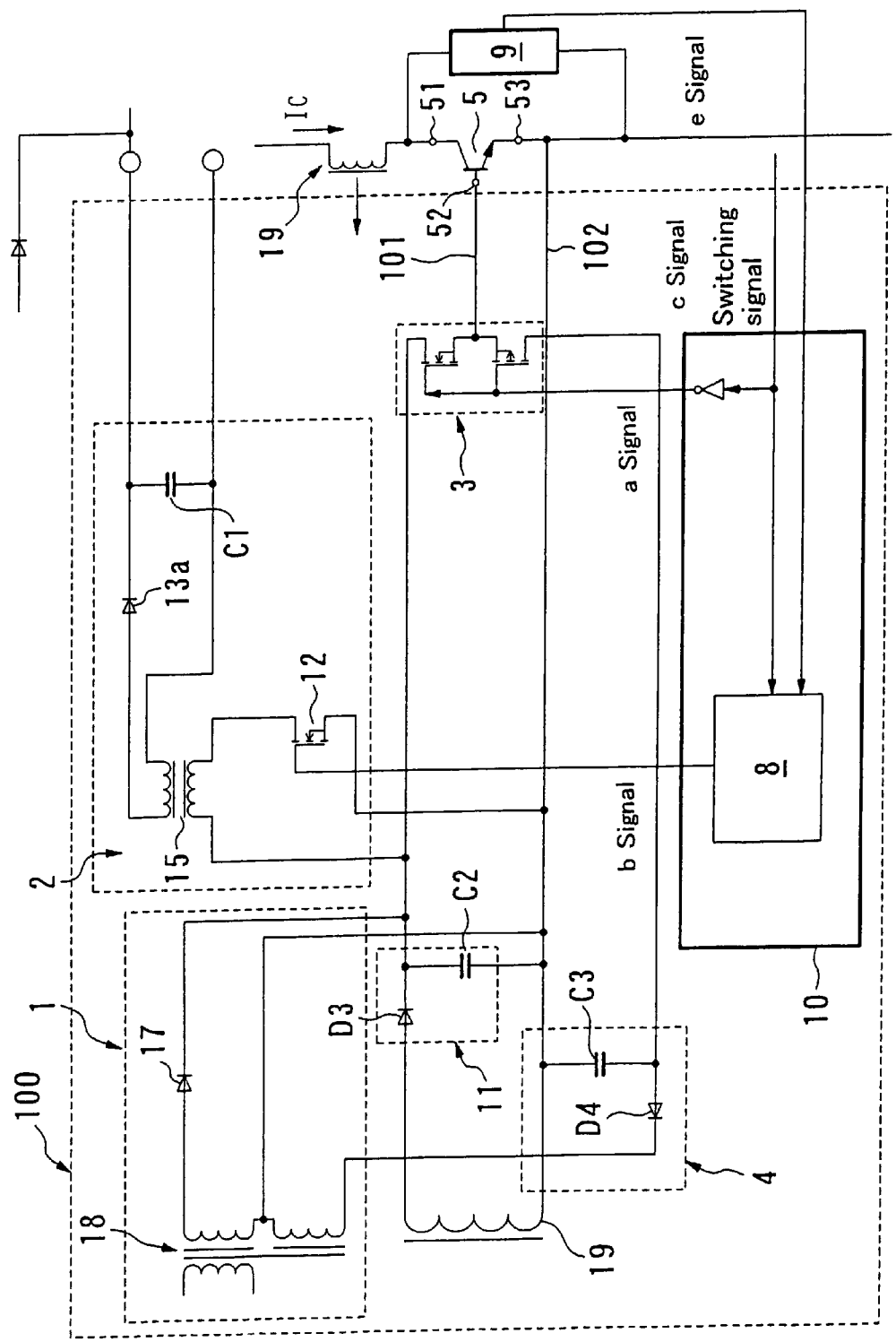
FIG. 5 is a circuit diagram showing an example of a switching-element driving device according to another embodiment of the present invention.

FIG. 5 shows another embodiment of the present invention. In this embodiment, the power regenerating circuit 2 has a power regenerating transformer 15, and the secondary winding of the transformer 15 is connected to the external auxiliary power supply through the rectifier circuit composed of a diode 13a and a capacitor C1. The current supply 1 includes a transformer 18 connected to the voltage supply 11. The switching element 12 controllably switched by the signal from the control circuit 8 is connected to the primary side of the transformer 15. The secondary side of the transformer 18 is connected to the primary side of the transformer 15 through the rectifier element 17 and the switching element 12. The rectifier element 17 and the switching element 12 may be composed of the diode and the switching element as with the rectifier elements 12, 14.

Figure 6:
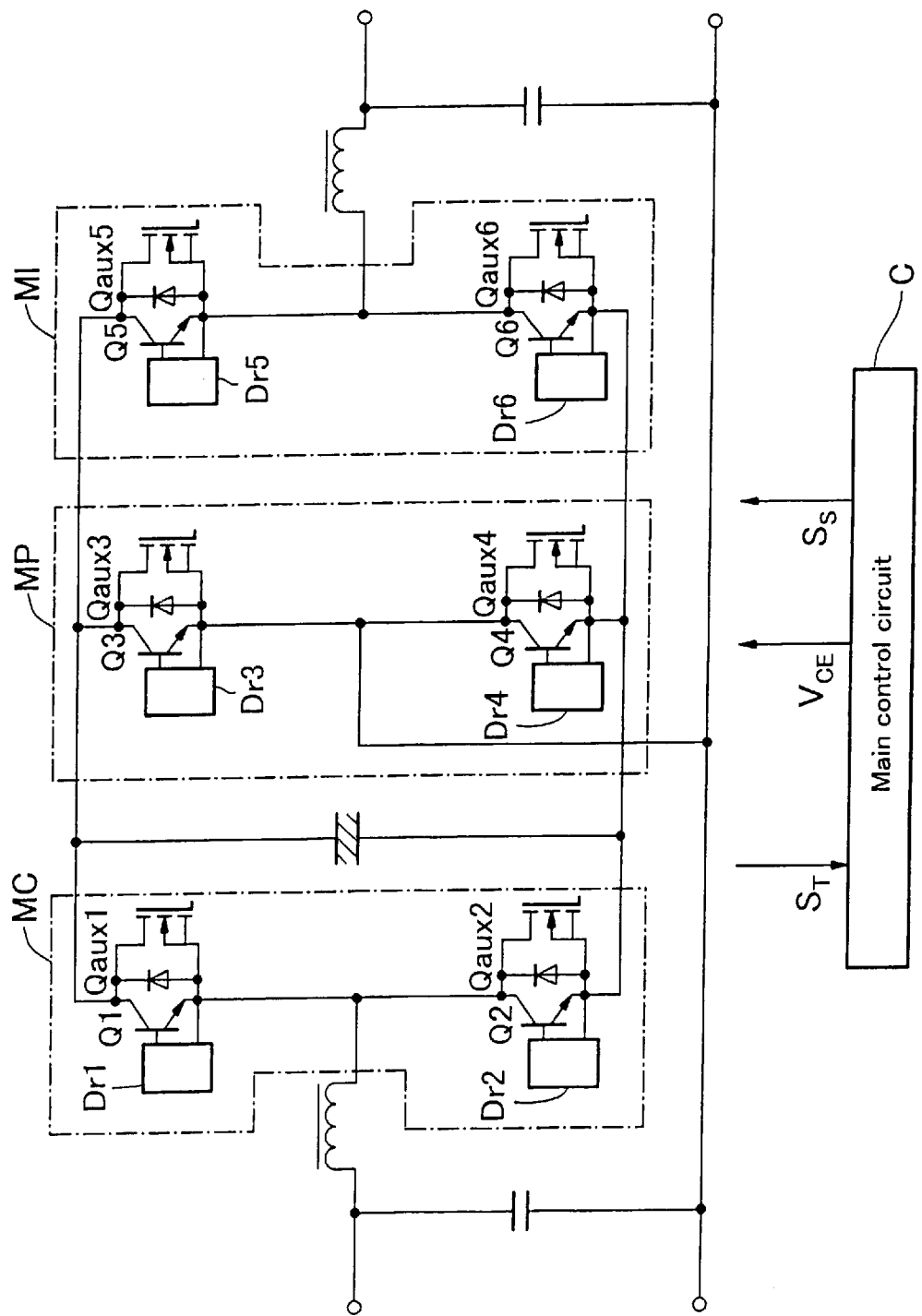
FIG. 6 is a circuit diagram showing one example of a power conversion apparatus applied with a driving circuit of the present invention.

FIG. 6 is a circuit diagram of a substantial section of a forward conversion apparatus and a reverse conversion apparatus employing the driving circuit of the present invention used in an uninterruptible power supply. This circuit includes transistors Q1 and Q2 forming main switching means, an inverter MC composed of transistors Q1aux and Q2aux and connected in parallel with each of the transistors Q1 and Q2 to form auxiliary switching means, transistors Q5 and Q6 forming main-switching means, a converter MI composed of transistors Q5aux and Q6aux and connected in parallel with each of the transistors Q5 and Q6 to form an auxiliary switching element, and a polarity switching arm MP connected between the inverter MC and the converter MI. The polarity switching arm MP comprises transistors Q3 and Q4 forming main switching means, and transistors Q3aux and Q4aux connected in parallel with each of the transistors Q3 and Q4 to form auxiliary switching means. This circuit is an input-output synchronous type non-insulated CVCF apparatus. The inverter MC and the converter MI are PWM-driven to rectify waveforms of input current and input voltage, and the polarity switching arm MP is driven by a commercial power supply frequency of 50 or 60 Hz. This circuit structure is known and thus the detailed description will be omitted.

Each of the main switching means Q1, Q2, Q3, Q4, Q5 and Q6 is driven by driving circuits Dr1, Dr2, Dr3, Dr4, Dr5 and Dr6 having the same structure as that of the driving circuit shown in FIG. 1 or FIG. 5. The switching signal Ss for driving these driving circuits and the auxiliary switching means Q1aux, Q2aux, Q3aux, Q4aux, Q5aux and Q6aux, the collector-emitter voltage command signal Vce, and the detection signal ST from each detector are sent out from the main control circuit C.

Since the current detector is provided not only in the circuit shown in FIG. 6 but also other power conversion apparatuses for various purposes, the collector current in each transistor may be acquired in real time. Thus, when the driving circuit according to the present invention is applied to any actual power conversion apparatus, it is unnecessary to provide a separate current detector in the driving device itself. Further, one or both of the collector-emitter voltage command processor 7 in the driving circuit and the control circuit 8 are mounted in the main control circuits provided in the power conversion apparatus.

Figure 7:
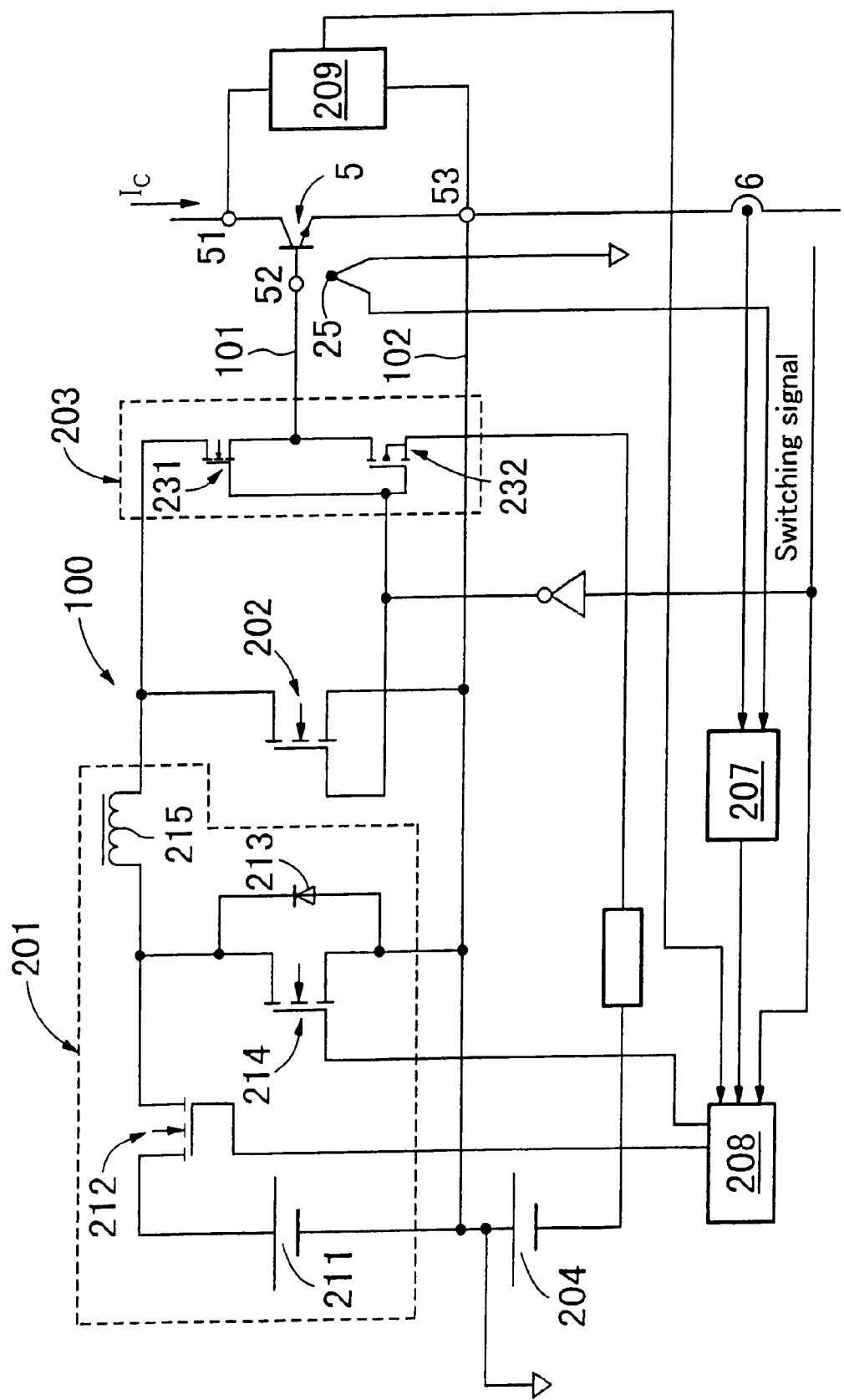
FIG. 7 is a circuit diagram showing one embodiment of a switching-element driving device according to the present invention.

FIG. 7 shows still another embodiment according to the present invention. In FIG. 7, the transistor being the current-controlled semiconductor switching element includes the collector 51, the base 52, and the emitter 53. The collector 51 of the transistor 5 is connected to the power supply (not shown). The driving circuit 100 is provided to control the switching operation of the transistor 5 being a switching element.

The driving circuit 100 has a current supply 201 capable of controlling its output current by a signal from outside. A circulating switch 202 is connected between the positive terminal and the negative terminal of the current supply 201. The ON-OFF switching circuit 203 is arranged in parallel with the circulation switch 202. One end of this ON-OFF switching circuit 203 is connected to the positive terminal of the current supply 201 and the other end is connected to the negative terminal of the current supply 201 through a reverse bias power supply 204. An output of the ON-OFF switching circuit 203 is connected to the base 52 of the transistor 5 through the output main line 101 of the driving circuit 100. The driving circuit 100 has the output return line 102, which is connected to a negative terminal of the current supply 1.

As shown in FIG. 7, the current supply 201 has a voltage supply 211. A switching element 212 and an inductor 215 are connected in series with a positive terminal of the voltage supply 211, and an end of the inductor 215 is connected to the ON-OFF switching circuit 203. Each one end of a rectifier element 213 and an auxiliary rectifier element 214 connected in parallel with each other is connected to a connection point of the switching element 212 and the inductor 215, and each the other end is connected to the negative terminal of the voltage supply 211. The rectifier element 213 is composed of a diode having a forward direction directing toward the connection point between the switching element 212 and the inductor 215, and the auxiliary rectifier element 214 is composed of a field effect transistor (FET).

The ON-OFF switching circuit 203 is composed of a positive switching element 231 and a negative switching element 232 connected in series with each other, and a connection point of the switching elements 231 and 232 is connected to the output main line 101. Each of the circulation switch 202 and the switching elements 231 and 232 is composed of a field effect transistor, and a switching signal for controlling the on-off operation of these elements is supplied from a control device (not shown).

A current detector 206 is provided to detect the collector current Ic flowing through the collector of the transistor 5. A temperature detector 225 is provided to detect the temperature T of the transistor 5. A collector current signal from the current detector 206 and a temperature signal from the temperature detector 225 are input into a collector-emitter voltage command processor 207. The output of the processor 207 is input into a control circuit 208 for outputting a control signal to control the output current of the current supply 201. A switching signal is also input into the control circuit 208. In addition, a voltage detector 209 is provided at the transistor 5 to detect the collector-emitter voltage of the transistor 5. The detected voltage signal is input into the control circuit 208. The control circuit 208 generates a control signal based on the input signal. The control signal is used to control the switching operation of the switching element 212 and the auxiliary rectifier element 214 in the current supply 201.

The operation of the driving circuit 100 shown in FIG. 7 will now be described. When the driving circuit 100 is turned on, the positive switching element 231 of the switching circuit 203 is turned on, and the negative switching element 232 is turned off, by the switching signal applied from outside. Since the circulating switch 202 is in turned-off state, the output of the driving circuit 100 is supplied from the output main line 101 to the base 52 of the transistor 5 to turn on the transistor 5.

In the driving circuit 100, the collector current $I_c$ of the transistor 5 is detected by the current detector 206, and the detected collector current signal is input into the collector-emitter voltage command processor 207. At the same time, the temperature of the transistor is detected by the temperature detector 225, and the detected temperature signal is input into the collector-emitter voltage command processor 207. The processor 207 calculates the optimum value of the collector-emitter voltage of the transistor 5 based on the current signal from the input collector current detector 206 and the temperature signal from the temperature detector 225, and transmits the calculated result to the control circuit 208 as the collector-emitter voltage command signal. The collector-emitter voltage of the transistor 5 is detected by the voltage detector 209 and this voltage detection signal is input into the control circuit 208.

The control circuit 208 generates a control signal based on the collector-emitter voltage command signal and the actual collector-emitter voltage value from the detector 209. The control signal is used to drive the switching elements 212 and 214 in the current supply 201. The current supplied from the current supply 201 is applied to the base 52 of the transistor 5 from the output main line 101 through the ON switch 231 of the ON-OFF switching circuit 203. In this manner, the base current of the transistor 5 is controlled to provide an optimum value of the collector-emitter voltage of the transistor 5.

FIG. 2 is a diagram showing the saturation voltage characteristic between the collector and the emitter with respect to the collector current during the transistor 5 is turned on.

In the driving circuit 100 shown in FIG. 7, the data of the characteristic curve of the collector-emitter voltage $V_{CE}$(sat) to the collector current shown in FIG. 2 or another data of a characteristic curve indicating a slightly lower than that in the above characteristic data is also stored in the collector-emitter voltage command processor 7. The stored data of this characteristic value in the processor 207 may be corrected depending on the individual dispersion of the transistor 5. The processor 207 reads out the optimum collector-emitter voltage value from the data of the stored characteristic value based on the current signal detected by the collector current detector 206 and the temperature signal detected by the temperature detector 225, and then calculates the collector-emitter voltage command to apply it to the control circuit 208. In this manner the output current, which is output to the output main line 101 of the driving circuit 100 and applied to the base of the transistor 5, is set to allow the transistor 5 to be operated by the optimum collector-emitter voltage. Thus, the transistor 5 may be operated under the conditions such that a sum of conduction loss and driving power during the transistor is turned on, including the individual dispersion of the transistor, is decreased.

The structure of the collector-emitter voltage command processor 207 in this driving circuit 100 may be the same as that shown in FIG. 3.

The operation during the transistor 5 is turned off will now be described. In the OFF state, the circulating switch 202 is turned on, and the current from the current supply 201 bypasses the switching circuit 203. In the switching circuit 203, the ON switch 231 is turned off, and the OFF switch 232 is turned on. As a result, the reverse bias is supplied to the base 252 of the transistor 5 from the reverse bias power supply 204. Thus, the accumulated electric charge in the transistor 5 is taken out in a short time. This allows the turn-off operation to be carried out at high speed and a noise margin to be sufficiently provided during the turn-off operation. When the switching circuit 203 is turned on from its OFF state, the circulating switch 202 is operated to bypass the energy accumulated in the inductor 215 to prevent regeneration of the overvoltage in the driving circuit 100. In this state, the switching element 212 and the auxiliary rectifier element 214 in the current supply 201 are turned off by the signal from the control circuit 208.

Figure 8:
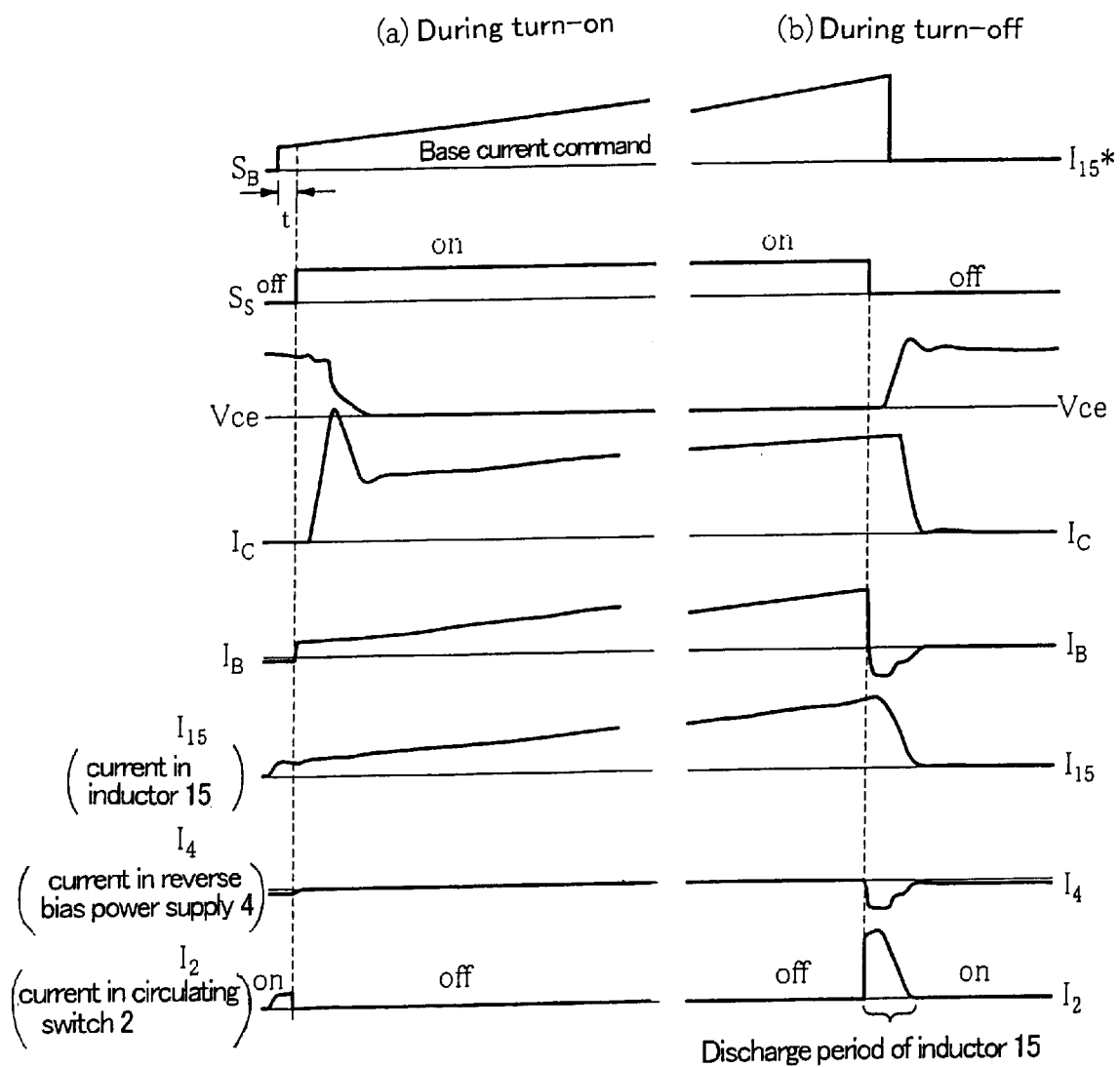
FIG. 8 is a diagram showing a waveform at each section during switching operations in an embodiment of the present invention.

The switching operation will now be described. FIGS. 8(a) and 8(b) show waveforms at each part in the driving circuit 100 during the switch is turned on and turned off. With reference to FIG. 8(a), when the transistor 5 is switched from OFF state to ON state, a base current command signal $S_B$ is applied to the switching element 212 and the auxiliary rectifier element 214 from the control circuit 208, and a current 115 simultaneously starts to flow toward the inductor 215. When the inductor 215 is completely charged after the time t, the switching signal Ss is output to the switching circuit 203 from the control circuit 208. Then, the ON switch 231 in the switching circuit 203 is turned on, and the OFF switch 232 is turned off. At this time, the circulating switch 202 is in OFF state. In this state, since the inductor 215 functions as with the power supply, the base electric potential of the transistor 5 is activated rapidly, and the current flows into the transistor 5 rapidly. This state is shown as the collector current Ic in FIG. 8(a). Thus, the transistor 5 may be turned on at higher speed by the driving circuit 100.

For turning off the transistor 5, when the turn-off signal is applied in FIG. 8(b), the circulating switch 202 is turned on. As a result, the base current of the transistor 5 is shut off immediately. At the same time, the ON switch 231 in the switching circuit 203 is turned off, and the OFF switch 232 is turned on. Then, the reverse bias is supplied to the base 252 of the transistor 5 from the reverse bias power supply. In the current supply 201, while the switching element 212 and the auxiliary rectifier element 214 may be maintained at a constant current output state, they may be shut off by an appropriate device. The energy accumulated in the inductor 215 is consumed by the diode forming the circulating switch 202 and the rectifier element 213. This causes the loss of the driving circuit 100. However, the driving circuit 100 is driven by a high frequency so that the inductor 215 may be set in a small inductance, which may provide a small loss.

As described above, in the aforementioned embodiment in the present invention, the transistor 5 is driven to have an optimum collector-emitter voltage by controlling the base current of the transistor 5. Thus, the optimum driving current and the collector-emitter voltage may be obtained despite of the dispersion of hfe of the individual transistor 5 and the variance of hfe by temperature, and thereby the conduction loss between the collector and the emitter in the transistor 5 and the driving power may be reduced. The switching element 212 and the auxiliary rectifier element 214 of the power supply 1 are driven at a high frequency of several hundred KHz or more. Further, the base current of the transistor 5 is supplied from this current variable driving circuit, and the driving current may be supplied continually. In addition, the transistor 5 which being a switching element may be kept in ON state or OFF state for a long time. The device may be driven by a Dc or low frequency.

The voltage drop between the base and the emitter of the transistor 5 used as a switching element is as low as 1V, but the loss of the driving circuit 100 may be reduced through the synchronous rectifier effect by using the switching element, such as FET, as an auxiliary rectifier element 214 in the current supply 201 of the driving circuit 100. Since 1V is sufficient for the output of the driving circuit 100, the voltage inside of the driving circuit may be set in a few V at minimum. Thus, the low withstand voltage and the low on-resistance element, such as FET, may be used for the switching element 212 and the auxiliary rectifier element 214, which may provide further reduced loss in the driving circuit.

In the above embodiment, the transistor 5 has been described as a type having the collector 51, the base 52, and the emitter 53. However, in case that the bipolar mode static induction transistor (BSIT) is used as a switching element, a drain takes the place of the collector, a gate does the base, and a source does the emitter. The control circuit 208 may be formed in a digital construction, or in an analog construction using analog components, such as an operational amplifier and a comparator.

Figure 9:
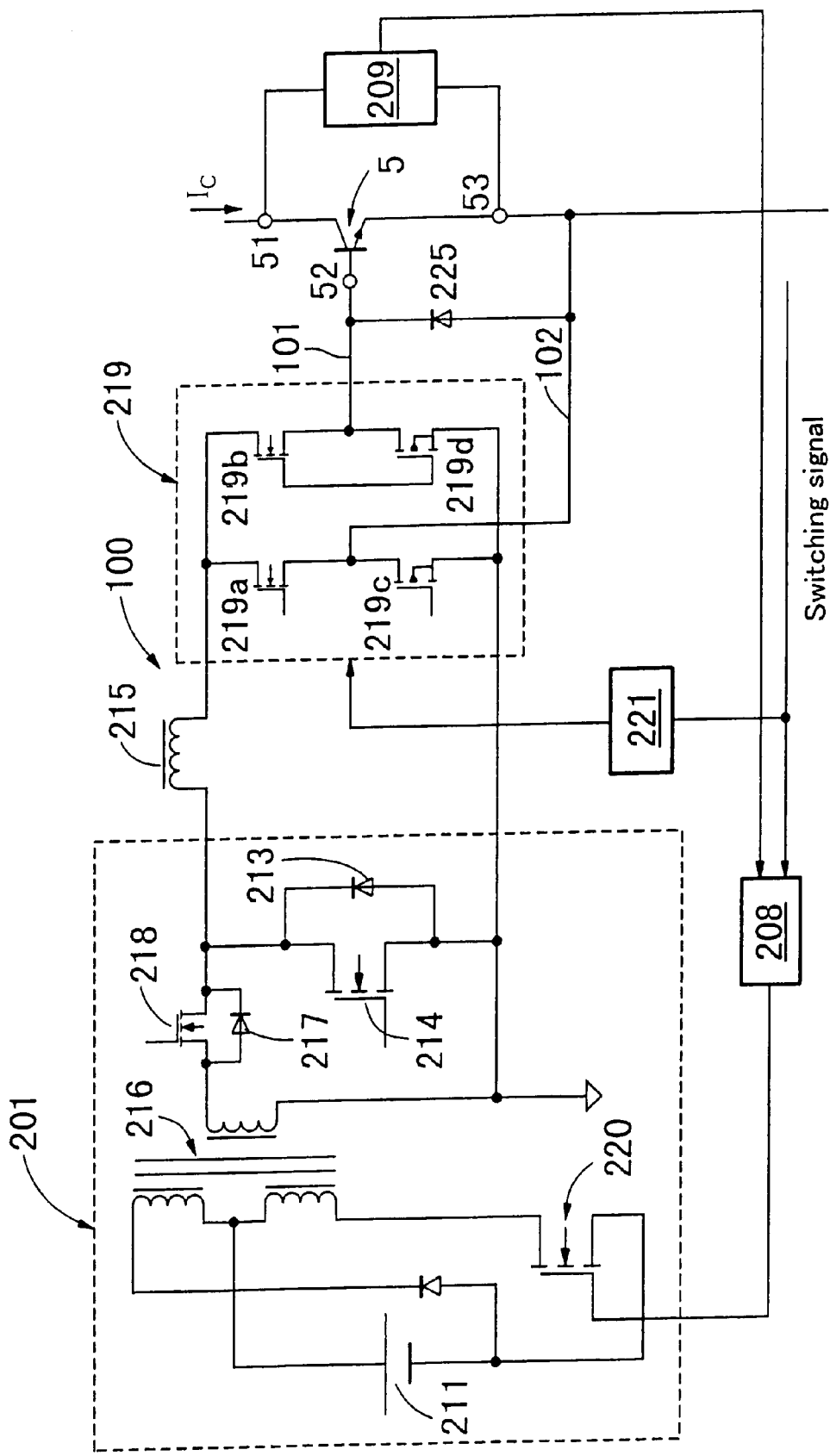
FIG. 9 is a circuit diagram showing a switching-element driving device according another embodiment of the present invention.

FIG. 9 shows another embodiment of the present invention. In this embodiment, the current supply 201 has a transformer 216 connected to the voltage supply 211. A switching element 220 controllably switched by the signal from the control circuit 208 is connected to the primary side of the transformer 216. The secondary side of the transformer 216 is connected to the inductor 215 through rectifier elements 217 and 218. The rectifier elements 217 and 218 are composed of a diode and a switching element as with the rectifier elements 213 and 214.

In this embodiment, a switching circuit 219 composed of four bridge-connected switching elements 219a, 219b, 219c, and 219d is provided as a substitute for the switching circuit 203 in the embodiment shown in FIG. 7. A connection point of the switching elements 219b and 219d is connected to the output main line 101 in the driving circuit 100, and a connection point of the switching elements 219a and 219c is connected to the output return line 102 in the driving circuit 100.

In this driving circuit 100, the power is transmitted through the transformer 116. The driving circuit 100 and the transistor 5 may be electrically insulated by transmitting various signals using insulating components, such as a pulse transformer and a photo coupler. It is often the case that a plurality of switching elements, such as the transistors 5, are bridge-connected and driven in actual power conversion apparatuses, and the emitter potential of the transistor is varied. Thus, it is necessary for each transistor to be provided with the insulating type driving circuit. The circuit shown in FIG. 9 may be used just for this purpose. If a DC voltage supply insulated to each driving circuit may be applied, the driving circuit shown in FIG. 7 may sufficiently achieve this purpose.

We claim:

1. A switching-element driving device in a power conversion apparatus including a current-controlled semiconductor switching element having a collector, an emitter and a base, said switching-element driving device comprising:
    an output main line connected to said base of said switching element;
    an output return line connected to said emitter;
    a current transformer having a primary winding connected in series with said switching element;
    a driving power supply for said switching element, having rectifier means connected to a secondary winding of said current transformer;
    a driving switch for supplying an output of said driving power supply to said base of said switching element;
    collector-emitter voltage detecting means for detecting a voltage between said collector and emitter of said switching element
    a regenerating circuit for supplying a regenerative power from said output of said driving power supply to another section having a power demand; and
    a collector-emitter voltage control circuit for controlling said regenerative power to be supplied from said regenerating circuit to said another section in response to a collector-emitter voltage signal from said collector-emitter voltage detecting means so as to vary a base current to be applied to said base of said switching element and thereby control said collector-emitter voltage.

2. A switching-element driving device as defined in claim 1, which further includes:
    a driving power supply for supplying a current to drive said switching element; and
    a reverse bias circuit for applying a reverse bias to said base of said switching element, wherein said collector-emitter voltage control circuit includes on-driving switching means adapted to connect said driving power supply to said base of said switching element, off-driving switching means adapted to connect said reverse bias power supply to said base of said switching element, and control means for controlling said regenerative power based on said collector-emitter voltage signal received from said collector-emitter voltage detecting means so as to control said base current to be supplied to said base of said switching element and thereby control said collector-emitter voltage, wherein said on-driving switching means is conducted and said off-driving switching means is shut off when said switching element is turned on, while said off-driving switching means is conducted and said on-driving switching means is shut off when said switching element is turned off, so as to allow said switching element to be rapidly turned off by said reverse bias from said reverse bias power supply.

3. A switching-element driving device as defined in claim 2, which is adapted to supply an activating power from said section supplied with said regenerative power to said driving power supply during an activation period of said driving power supply.

4. A switching-element device as defined in claim 1, wherein said collector-emitter voltage control circuit includes switching means for controlling said regenerative power by the switching operation of said switching means so as to vary said base current to be applied to said base of said switching element, and rectifier means provided at an output section of said switching means, said rectifier means including a rectifier element and an auxiliary rectifier element having a lower conduction resistance than that of said switching means.

5. A switching-element driving device as defined in claim 1, which further includes temperature detecting means for detecting a temperature of said switching element, and a current control section adapted to store an optimum data of said collector-emitter voltage corresponding to plural different temperature values of said switching element, and define an optimum value of said collector-emitter voltage based on a temperature signal from said temperature detecting means.

6. A switching-element driving device as defined in claim 3, which further includes current detecting means for detecting a collector current flowing through said collector of said switching element, wherein said collector-emitter voltage control means is adapted to store an optimum data of said collector-emitter voltage corresponding to plural different current values of said switching element, and define an optimum value of said collector-emitter voltage based on a collector current signal from said current detecting means.

7. A switching-element driving device in a power conversion apparatus including a current-controlled semiconductor switching element having a collector, an emitter and a base, said switching-element driving device comprising:
    an output main line connected to said base of said switching element;
    an output return line connected to said emitter; and
    collector-emitter voltage control means, wherein
    said collector-emitter voltage control means includes-collector-emitter voltage detecting means for detecting a voltage between said collector and emitter of said switching element, said collector-emitter voltage control means controlling a base current to be applied to said base of said switching element so as to control said collector-emitter voltage to reduce a sum of conduction loss and driving power of said switching element.

8. A switching-element driving device as defined in claim 7, which further includes:
- a driving power supply for supplying a current to drive said switching element; and
- a reverse bias means for applying a reverse bias to said base of said switching element, wherein
- said collector-emitter voltage control means includes on-driving switching device adapted to connect said driving power supply to said base of said switching element, off-driving switching device adapted to connect said reverse bias power supply to said base of said switching element, and control means for controlling a base current supplied to said base of said switching element based on a collector-emitter voltage signal received from said collector-emitter voltage detecting means so as to control said collector-emitter voltage, wherein said on-driving switching means is conducted and said off-driving switching means is shut off when said switching element is turned on, while said off-driving switching means is conducted and said on-driving switching means is shut off when said switching element is turned off, so as to allow said switching element to be rapidly turned off by said reverse bias from said reverse bias power supply.

9. A switching-element driving device as defined in claim 7, wherein said collector-emitter voltage control means includes a current control section for storing an optimum data of said collector-emitter voltage of said switching element, and supplying to said base of said switching element said base current controlled based on said stored data and said collector-emitter voltage signal from said collector-emitter voltage detecting means.

10. A switching-element driving device as defined in claim 9, which further includes temperature detecting means for detecting a temperature of said switching element, wherein said current control section is adapted to store an optimum data of said collector-emitter voltage corresponding to plural different temperature signals from said temperature detecting means, and define an optimum value of said collector-emitter voltage based on a temperature signal from said temperature detecting means.

11. A switching-element driving device as defined in claim 9, further includes current detecting means for detecting a collector current flowing through said collector of said switching element, wherein said collector-emitter voltage control means is adapted to store an optimum data of said collector-emitter voltage corresponding to plural different current values of said switching element, and define an optimum value of said collector-emitter voltage based on a collector current signal from said current detecting means.

12. A switching-element driving device as defined in claim 7, wherein said collector-emitter voltage control means includes base current control switching means for variably controlling said base current of said switching element by the switching operation of said base current control switching means, and rectifier means provided at an output section of said base current control switching means, said rectifier means having a rectifier element and an auxiliary rectifier element having a lower conduction resistance than that of said base current control switching element.

13. A method of driving a switching element, comprising the steps of:
- obtaining a power from a secondary winding of a current transformer having a primary winding connected in series with said switching element;
- supplying a part of said obtained power to another section having a power demand as a regenerative power;
- detecting a voltage between a collector and emitter of said switching element as obtaining a driving current to be applied to a base of said switching element from said remaining power so as to drive said switching element, and
- controlling said regenerative power based on said detected collector-emitter voltage value so as to vary said driving current to be applied to said base of said switching element and thereby control said collector-emitter voltage.

* * * * *

UNITED STATES PATENT AND TRADEMARK OFFICE
CERTIFICATE OF CORRECTION

PATENT NO. : 6,414,854 B2
DATED : July 2, 2002
INVENTOR(S) : Kazuyuki Itoh

It is certified that error appears in the above-identified patent and that said Letters Patent is hereby corrected as shown below:

<u>Title page,</u>
Insert:
-- Related U.S. Application Data
[62] Continuation of Application No. PCT/JP00/06953, filed on October 5, 2000. --

<u>Column 1,</u>
Line 6, add the following:
-- This is a continuation of International Application PCT/JP00/06953, filed on October 5, 2000. --

Signed and Sealed this

Fourth Day of November, 2003

JAMES E. ROGAN
*Director of the United States Patent and Trademark Office*